US 8,204,042 B2

(12) United States Patent
Anschutz et al.

(10) Patent No.: US 8,204,042 B2
(45) Date of Patent: Jun. 19, 2012

(54) METHODS, SYSTEMS, AND COMPUTER PROGRAM PRODUCTS FOR ESTABLISHING VOIP SERVICE IN A NETWORK

(75) Inventors: Thomas Arnold Anschutz, Conyers, GA (US); Nicholas Steven Huslak, Duluth, GA (US); Edgar Vaughan Shrum, Jr., Smyrna, GA (US)

(73) Assignee: AT&T Intellectual Property I, L.P.

( * ) Notice: Subject to any disclaimer, the term of this patent is extended or adjusted under 35 U.S.C. 154(b) by 1515 days.

(21) Appl. No.: 10/933,940

(22) Filed: Sep. 3, 2004

(65) Prior Publication Data
US 2005/0025136 A1 Feb. 3, 2005

Related U.S. Application Data

(63) Continuation-in-part of application No. 10/756,790, filed on Jan. 13, 2004.

(60) Provisional application No. 60/470,650, filed on May 15, 2003.

(51) Int. Cl.
*H04L 12/66* (2006.01)

(52) U.S. Cl. ..... 370/352; 370/230; 370/235; 379/220.01; 379/229; 709/203; 709/217; 709/226; 709/228

(58) Field of Classification Search .......... 709/249, 709/201–207, 217–244; 370/395.52, 230, 370/232, 235, 237, 351–356, 259–271; 379/220.01, 379/221.07, 243, 229; 455/3.03, 445
See application file for complete search history.

(56) References Cited

U.S. PATENT DOCUMENTS

| | | | |
|---|---|---|---|
| 5,513,117 A | 4/1996 | Small | |
| 5,557,320 A | 9/1996 | Krebs | |
| 5,675,732 A | 10/1997 | Majeti et al. | |
| 5,847,760 A | 12/1998 | Elmaliach et al. | |
| 6,046,980 A | 4/2000 | Packer | |
| 6,594,265 B1 | 7/2003 | Etorre et al. | |
| 6,714,987 B1 * | 3/2004 | Amin et al. | 709/249 |
| 6,788,676 B2 * | 9/2004 | Partanen et al. | 370/352 |
| 6,901,446 B2 | 5/2005 | Chellis et al. | |
| 6,910,074 B1 * | 6/2005 | Amin et al. | 709/227 |
| 6,931,444 B2 | 8/2005 | Schweitzer | |
| 6,934,745 B2 | 8/2005 | Krautkremer | |
| 6,975,594 B1 | 12/2005 | Byers | |
| 6,976,003 B1 | 12/2005 | Hamor et al. | |
| 7,046,680 B1 | 5/2006 | McDysan et al. | |
| 7,068,607 B2 * | 6/2006 | Partain et al. | 370/241 |
| 7,113,479 B2 | 9/2006 | Wong | |
| 7,124,195 B2 | 10/2006 | Roach et al. | |

(Continued)

OTHER PUBLICATIONS

About the DSL Forum "Who We Are: Staff" Retrieved from the Internet Aug. 3, 2007 at URL http://www.dslforum.org/about/staff.shtml.

(Continued)

*Primary Examiner* — Hemant Patel
(74) *Attorney, Agent, or Firm* — Myers Bigel Sibley & Sajovec, P.A.

(57) ABSTRACT

Voice over Internet Protocol (VoIP) service is established in a network that that includes a Regional/Access Network (RAN) that facilitates differentiated end-to-end data transport between an Application Service Provider (ASP) and a Customer Premises Network (CPN) that includes Customer Premises Equipment (CPE). Application Programming interface (API) calls are used at the ASP to communicate with the RAN to establish VoIP service for the user having a user selected bandwidth and/or QoS associated therewith.

33 Claims, 4 Drawing Sheets

U.S. PATENT DOCUMENTS

| | | | |
|---|---|---|---|
| 7,149,892 B2 | 12/2006 | Freed et al. | |
| 7,171,485 B2 | 1/2007 | Roach et al. | |
| 7,185,070 B2 * | 2/2007 | Paul et al. | 709/220 |
| 7,213,071 B2 | 5/2007 | DeLima et al. | |
| 7,246,154 B1 * | 7/2007 | Sitaraman et al. | 709/217 |
| 7,380,022 B2 * | 5/2008 | Tell et al. | 709/249 |
| 2002/0054059 A1 | 5/2002 | Schneiderman | |
| 2002/0064149 A1 | 5/2002 | Elliott et al. | |
| 2002/0064164 A1 * | 5/2002 | Barany et al. | 370/401 |
| 2002/0087696 A1 | 7/2002 | Byrnes | |
| 2002/0103895 A1 | 8/2002 | Chiang | |
| 2002/0116488 A1 | 8/2002 | Subramanian et al. | |
| 2002/0152319 A1 * | 10/2002 | Amin et al. | 709/232 |
| 2002/0188732 A1 | 12/2002 | Buckman et al. | |
| 2003/0005112 A1 | 1/2003 | Krautkremer | |
| 2003/0014462 A1 | 1/2003 | Bennett et al. | |
| 2003/0023721 A1 | 1/2003 | Vinberg | |
| 2003/0023722 A1 | 1/2003 | Vinberg | |
| 2003/0069964 A1 | 4/2003 | Shteyn et al. | |
| 2003/0074439 A1 | 4/2003 | Grabarnik et al. | |
| 2003/0074443 A1 * | 4/2003 | Melaku et al. | 709/224 |
| 2003/0074445 A1 | 4/2003 | Roach et al. | |
| 2003/0074474 A1 | 4/2003 | Roach et al. | |
| 2003/0078939 A1 | 4/2003 | Ma | |
| 2003/0084145 A1 | 5/2003 | Ramachandran et al. | |
| 2003/0084147 A1 | 5/2003 | Gourraud | |
| 2003/0084150 A1 | 5/2003 | Hansen et al. | |
| 2003/0229720 A1 | 12/2003 | Kiremidjian et al. | |
| 2003/0233422 A1 | 12/2003 | Csaszar et al. | |
| 2004/0015776 A1 | 1/2004 | Scott | |
| 2004/0093513 A1 | 5/2004 | Cantrell et al. | |
| 2004/0111308 A1 | 6/2004 | Yakov | |
| 2004/0199604 A1 | 10/2004 | Dobbins et al. | |
| 2004/0199667 A1 | 10/2004 | Dobbins | |
| 2004/0201752 A1 | 10/2004 | Parulski et al. | |
| 2004/0228291 A1 * | 11/2004 | Huslak et al. | 370/260 |
| 2004/0230678 A1 | 11/2004 | Huslak et al. | |
| 2004/0230683 A1 | 11/2004 | Adamczyk et al. | |
| 2004/0230695 A1 | 11/2004 | Anschutz et al. | |
| 2004/0252698 A1 * | 12/2004 | Anschutz et al. | 370/395.21 |
| 2005/0015493 A1 | 1/2005 | Anschutz et al. | |
| 2005/0015494 A1 | 1/2005 | Adamczyk et al. | |
| 2005/0021716 A1 | 1/2005 | Adamczyk et al. | |
| 2005/0021739 A1 | 1/2005 | Carter et al. | |
| 2005/0117576 A1 | 6/2005 | McDysan et al. | |
| 2006/0025219 A1 | 2/2006 | Nassef, Jr. et al. | |
| 2006/0031770 A1 | 2/2006 | McMenamin | |
| 2006/0039381 A1 * | 2/2006 | Anschutz et al. | 370/395.21 |
| 2006/0149811 A1 * | 7/2006 | Bennett et al. | 709/203 |
| 2006/0208074 A1 | 9/2006 | Eglen et al. | |
| 2007/0100981 A1 | 5/2007 | Adamczyk et al. | |
| 2007/0112956 A1 | 5/2007 | Chapman et al. | |

OTHER PUBLICATIONS

Battarbee, Katja, "Defining Co-Experience" *Proceedings of the 2003 International Conference on Designing Pleasurable Products and Interfaces* DPPI '03, Jun. 2003, pp. 109-113.

"BellSouth Teams with MyWay.com to Launch Next Generation Internet Portal" Business Wire, Dec. 8, 1999, [Retrieved Aug. 7, 2007 from the Internet at URL]: http://www.findarticles.com/p/articles/ml_mOEIN/is_1999_Dec_8/ai_58086123.

Chaudhury, Abhijit, et al., "Web Channels in E-commerce" Communications of the ACM, vol. 44, Issue 1, Jan. 2001, pp. 99-104.

U.S. Appl. No. 60/470,650, filed May 15, 2003, Adamczyk et al.

"DSL Evolution—Architecture Requirements for the Support of AoS-Enabled IP Services" *DSL Forum: Working Text WT-081* revision 4, 38 pages (Dec. 2002).

"DSL Evolution—Architecture Requirements for the Support of AoS-Enabled IP Services" *DSL Forum: Working Text WT-081* revision 5, 46 pages (Feb. 2003).

"DSL Evolution—Architecture Requirements for the Support of AoS-Enabled IP Services" *DSL Forum: Working Text WT-081* revision 6, 45 pages (Mar. 2003).

"DSL Evolution—Architecture Requirements for the Support of AoS-Enabled IP Services" *DSL Forum: Working Text WT-081* Straw Ballot Revision (7), 46 pages (Mar. 2003).

"DSL Evolution—Architecture Requirements for the Support of AoS-Enabled IP Services" *DSL Forum: Working Text WT-081* Straw Ballot Revision (8), 46 pages (Mar. 2003).

"DSL Evolution—Architecture Requirements for the Support of AoS-Enabled IP Services" *DSL Forum: Working Text WT-081* Straw Ballot Revision (9), 48 pages (Jun. 2003).

Anschutz et al. "Architecture & Transport Working Group" *DSL Forum: Proposed Draft* 37 pages (Aug. 2002).

Anzchutz (editor) "DSL Evolution—Architecture Requirements for the Support of QoS-Enabled IP Services" *Technical Report: DSL Forum, TR-059* 48 pages (Sep. 2003).

Blake et al. "Architecture for Differentiated Services" *The Internet Society memo*, 33 pages (1998).

Office Action from United States Patent and Trademark Office Corresponding to U.S. Appl. No. 10/756,790; Mail Date: Sep. 12, 2011; 2 pages.

\* cited by examiner

METHODS, SYSTEMS, AND COMPUTER PROGRAM PRODUCTS FOR ESTABLISHING VOIP SERVICE IN A NETWORK

RELATED APPLICATIONS

This application is a continuation in part of U.S. application Ser. No. 10/756,790, filed Jan. 13, 2004, which claims priority to U.S. Provisional Application No. 60/470,650, filed May 15, 2003, the disclosures of which are hereby incorporated herein by reference as if set forth in their entireties.

FIELD OF THE INVENTION

The present invention relates to communication networks, and, more particularly, to managing bandwidth and/or Quality of Service (QoS) in communication networks.

BACKGROUND OF THE INVENTION

The Internet is a decentralized network of computers that can communicate with one another via the Internet protocol (IP). Although the Internet has its origins in a network created by the Advanced Research Project Agency (ARPA) in the 1960's, it has only recently become a worldwide communication medium. To a large extent, the explosive growth in use and traffic over the Internet is due to the development in the early 1990's of the worldwide Web (WWW), which is one of several service facilities provided on the Internet. Other facilities include a variety of communication services such as electronic mail, telnet, Usenet newsgroups, internet relay chat (IRC), a variety of information search services such as WAIS and Archie, and a variety of information retrieval services such as FTP (file transfer protocol) and Gopher.

The WWW is a client-server based facility that includes a number of servers (computers connected to the Internet) on which Web pages or files reside, as well as clients (Web browsers), which interface the users with the Web pages. Specifically, Web browsers and software applications send a request over the WWW to a server requesting a Web page identified by a Uniform Resource Locator (URL) which notes both the server where the Web page resides and the file or files on that server which make up the Web page. The server then sends a copy of the requested file(s) to the Web browser, which in turn displays the Web page to the user.

The topology of the WWW can be described as a network of networks, with providers of network service called Network Service Providers, or NSPs. Servers that provide application-layer services as previously described may be described as Application Service Providers (ASPs). Sometimes a single service provider does both functions within a single business In recent years, broadband access technologies, such as digital subscriber line (DSL), cable modems, asynchronous transfer mode (ATM), and frame relay have facilitated the communication of voice, video, and data over the Internet and other public and private networks. Because broadband technologies are typically deployed by a single transport service provider, like a Regional Bell Operating Company (RBOC), their Regional and Access Networks (RAN) are often shared by many NSPs and ASPs offering services that range from Internet access and VPN access to Voice over IP, Video on Demand, and Gaming. Up until recently, a given Customer Premises Network (CPN) would have been connected to a single service provider in a generic way, however a new standard for RAN service (DSL Forum TR-059) provides a RAN architecture that allows simultaneous access to multiple NSPs and ASPs and for differentiating the data transport service provided by a RAN to these service providers.

Moreover, broadband access technology has allowed service providers to expand their content and service offerings to both business and home users. For example, a user may subscribe to multiple services or applications, such as voice service, Internet access service, a video service, a gaming service, etc. from one or more service providers. These services and/or applications may be delivered over a single network connection, such as a DSL line. Unfortunately, with multiple new connectivity options and applications that require specific characteristics from the network, there is also a need to establish QoS and bandwidth allocation among multiple services and/or applications so as to customize the content delivery according to the users' and/or providers' preferences.

SUMMARY OF THE INVENTION

According to some embodiments of the present invention, voice over Internet Protocol (VoIP) service is established in a network that that comprises a Regional/Access Network (RAN) that facilitates differentiated end-to-end data transport between an Application Service Provider (ASP) and a Customer Premises Network (CPN) that includes Customer Premises Equipment (CPE). Application Programming interface (API) calls are used at the ASP to communicate with the RAN to establish VoIP service for the user having a user selected bandwidth and/or QoS associated therewith.

In other embodiments of the present invention, the ASP receives a request from the user to register for VoIP service before using API calls at the ASP to communicate with the RAN.

In still other embodiments of the present invention, the CPE comprises a Routing Gateway (RG).

In still other embodiments of the present invention, API calls are used at the ASP to communicate with the RAN to obtain a bandwidth range and/or QoS capabilities from the RAN. The user is presented with, via the ASP, at least one bandwidth/QoS option within the bandwidth range and/or QoS capabilities and/or at least one derived service option received from the RAN.

In still other embodiments of the present invention, a user selection of one of the at least one bandwidth/QoS option and/or QoS capability and/or at least one derived service option is obtained at the ASP. The RAN is updated with a profile of information to provide the selected bandwidth/QoS option and/or QoS capability and/or derived service option for the user's VoIP service.

In still other embodiments of the present invention, the CPE is updated with the profile of information to provide the selected bandwidth/QoS option and/or QoS capability for the user's VoIP service.

In still other embodiments of the present invention, a rate limit and/or QoS associated with a communication queue in the RAN that is used to process VoIP traffic associated with the user's VoIP service is updated based on the profile of information.

In still other embodiments of the present invention, a VoIP call between the user and another user is processed using the profile of information in the RAN and the CPE.

In further embodiments of the present invention, the ASP is authenticated with the RAN prior to using API calls at the ASP to communicate with the RAN to establish VoIP service for the user.

In still further embodiments of the present invention, an establish service session request message is sent from the ASP to the RAN that contains an identification of the ASP and authorization credentials, and an establish service session response message is sent from the RAN to the ASP that contains an authentication result.

In still further embodiments of the present invention, the ASP is billed based on the user selected bandwidth for the VoIP service.

In still further embodiments of the present invention, the ASP is billed based on a facility purchased to connect the ASP to the RAN.

In still further embodiments of the present invention, the RAN comprises a Broadband Remote Access Server (BRAS).

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF EMBODIMENTS

Figure 1:
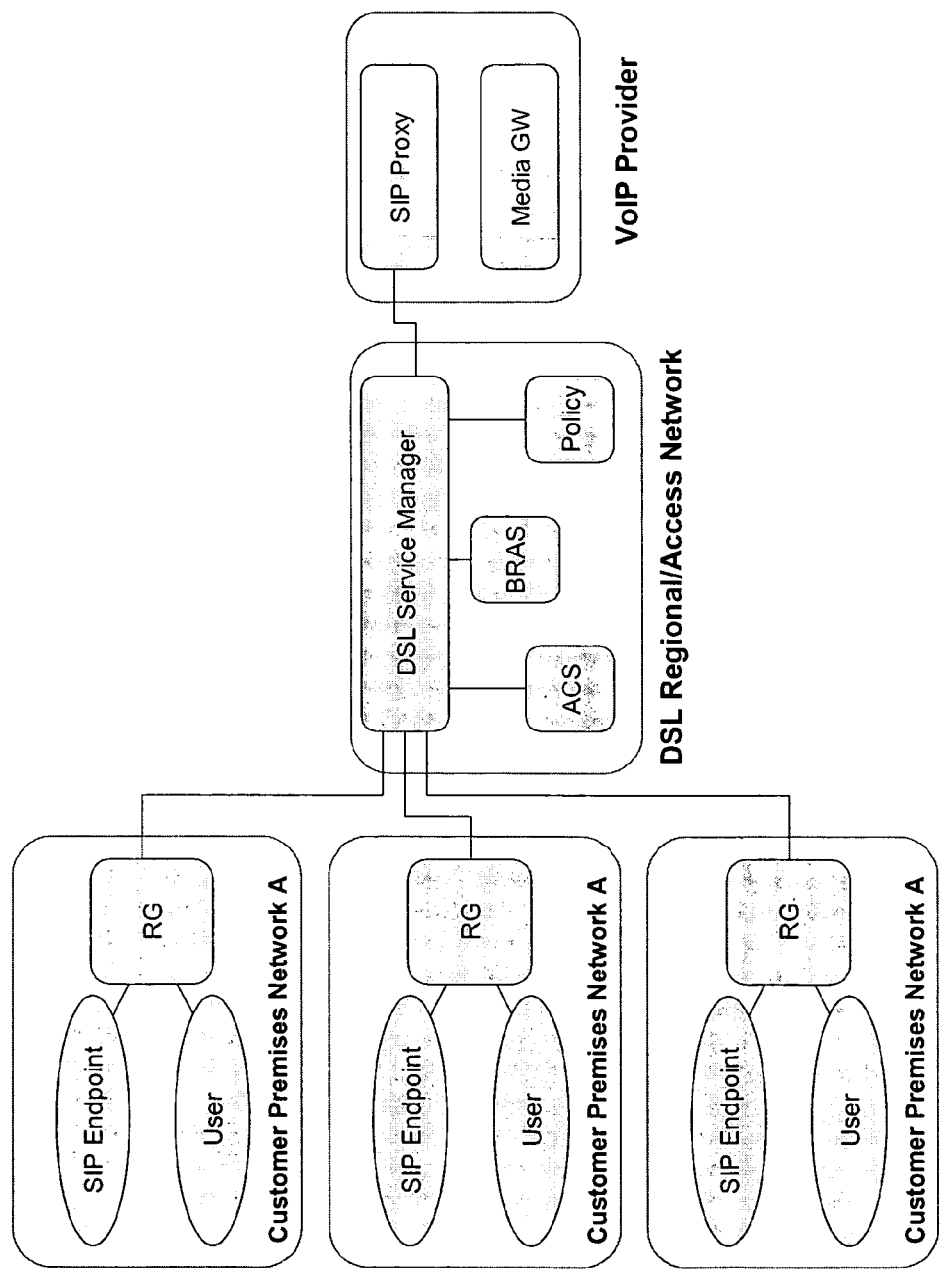
FIG. 1 is a Voice over Internet Protocol (VoIP) architecture using an application framework infrastructure in accordance with some embodiments of the present invention.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. It should be further understood that the terms "comprises" and/or "comprising" when used in this specification is taken to specify the presence of stated features, integers, steps, operations, elements, and/or components, but does not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The present invention may be embodied as systems, methods, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain or store the program for use by or in connection with the instruction execution system, apparatus, or device.

The computer-usable or computer-readable medium may be, for example but not limited to, an electronic, magnetic, optical, electromagnetic, infrared, or semiconductor system, apparatus, or device. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM).

Embodiments of the present invention are described herein in the context of digital subscriber line (DSL) technology for purposes of illustration. It will be understood that the present invention is not limited to DSL technology. Indeed, other communication technologies and/or network configurations, such as, but not limited to, asynchronous transfer mode (ATM), frame relay, hybrid fiber coax (HFC), wireless broadband, and/or Ethernet may also be used in other embodiments of the present invention. In general, the present invention is not limited to any communication technology and/or network configuration, but is intended to encompass any technology and/or network configuration capable of carrying out operations described herein. Embodiments of the present invention are also described herein in the context of managing quality of service (QoS). As used herein, QoS includes, but is not limited to, treatment applied to an access session, application flow, and/or packet with respect to scheduling a resource, bandwidth allocation, and/or delivery target in an individual element or across an end-to-end system.

As used herein, the term "protocol" refers to a defined set of rules that govern the exchange of data or information between two or more entities. In addition, a "protocol layer" refers to the hierarchical protocol structure represented by the open systems interconnection (OSI) model developed by the International Organization for Standardization in which layer one corresponds to the physical layer, layer two corresponds to the data link layer, layer three corresponds to the network layer, layer four corresponds to the transport layer, layer five corresponds to the session layer, layer six corresponds to the presentation layer, and layer seven corresponds to the application layer.

Applicants hereby incorporate by reference the disclosure of U.S. application Ser. No. 10/756,790, filed Jan. 13, 2004, from which the present application claims priority, in its entirety as if set forth fully herein. U.S. application Ser. No. 10/756,790 provides a detailed disclosure of, among other things, DSL Application Frameworks according to some embodiments of the present invention.

Methods, systems, and/or computer program products for establishing VoIP service in a network that comprises a Regional/Access Network (RAN) that facilitates differentiated end-to-end data transport between a Network Service Provider (NSP) and/or an Application Service Provider (ASP) and a Customer Premises Network (CPN) that includes Customer Premises Equipment, such as, for example, a Routing Gateway (RG), according to some embodiments of the present invention, will now be described.

VoIP is generally considered the migration of narrow band voice services into an IP network. Once voice is provided though an IP network, it can be integrated with other IP services providing capabilities that may not be achievable or cost effective in the PSTN. VoIP can take on various service models. This use case focuses on a service provider centric (ASP) model rather than a completely decoupled peer-to-peer model. Additionally, the use of SIP as the application protocol is assumed. FIG. 1 depicts an exemplary VoIP service architecture, in accordance with some embodiments of the present invention. A centralized SIP proxy device is deployed in the service provider's network that handles endpoint registration and authentication, feature activation, and call routing. For connectivity to the PSTN and audio conferencing capabilities, the ASP has also deployed a media server/gateway for this function.

VoIP can combine aspects of a network service as well as a peer-to-peer service (signaling vs. Bearer). Similar to the previous SIP based video conferencing example, a VoIP service may use randomly assigned RTP ports to transport the bearer traffic. Call signaling follows a client network server paradigm, but the bearer traffic can be either peer-to-peer (SIP phone to SIP Phone) or client to network server (SIP Phone to media gateway). Client to network server flows can be simply classified using the destination address of the SIP proxy or media server/gateway. Peer-to-peer traffic may not be as easily classified given that the dynamic nature of RTP. If multi-party audio conferencing will be a feature of the VoIP service, then a media server (mixer) may be required. Two-way calls between SIP users could be routed to the conference bridge providing a well-known IP address that can be used for classification. Alternatives to this approach include:

Route peer-to-peer calls through a well known network proxy device (presumably less expensive than a mixer because the are no DSPs required)

Allow the CPE to mark the traffic as VoIP (using the differentiated services code point) and in the network police the bandwidth allocated to that class (i.e. EF) on a per subscriber basis.

For simplicity, this use case will assume that the CPE will mark the traffic and be policed in the network.

The CPE could either be a SIP phone, analog terminal adaptor, or an Integrated Access Device (IAD) that has a built in xDSL modem in accordance with various embodiments of the present invention. In the non-integrated scenario it is assumed that the RG has ALG capabilities for NAT, firewall, and QoS.

The present invention is described herein with reference to flowchart and/or block diagram illustrations of methods, systems, and computer program products in accordance with exemplary embodiments of the invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Figure 2:
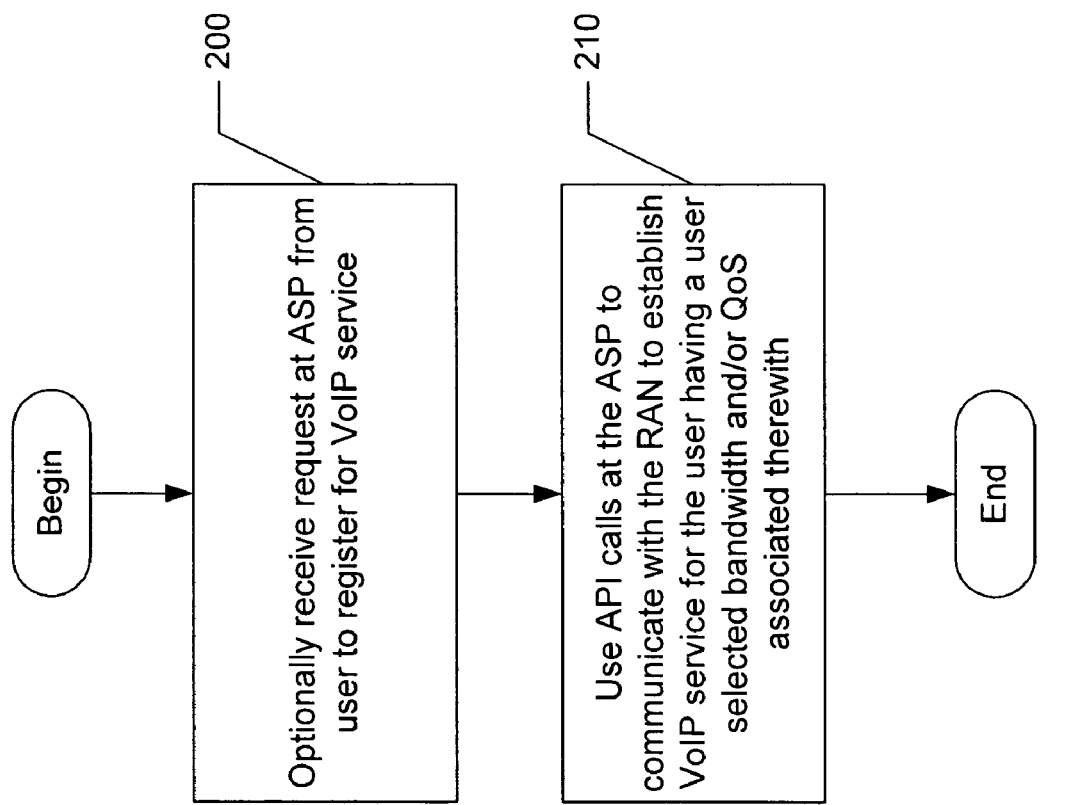
FIGS. 2 and 3 are flowcharts that illustrate operations for establishing a VoIP service in a network.

Referring now to FIG. 2, operations for establishing VoIP service in a network begin at block 200 where a request is optionally received at the ASP from a user to register for VoIP service. At block 210, the ASP uses Application Programming Interface (API) calls to communicate with the RAN (e.g., the BRAS) to establish VoIP service for the user. The VoIP service has a user selected bandwidth and/or QoS associated therewith. The API may comprise the Application-to-Network Interface (ANI) defined between the RAN and an ASP. Advantageously, the API may allow the ASP to establish VoIP service regardless of the technology used within the RAN.

Figure 3:
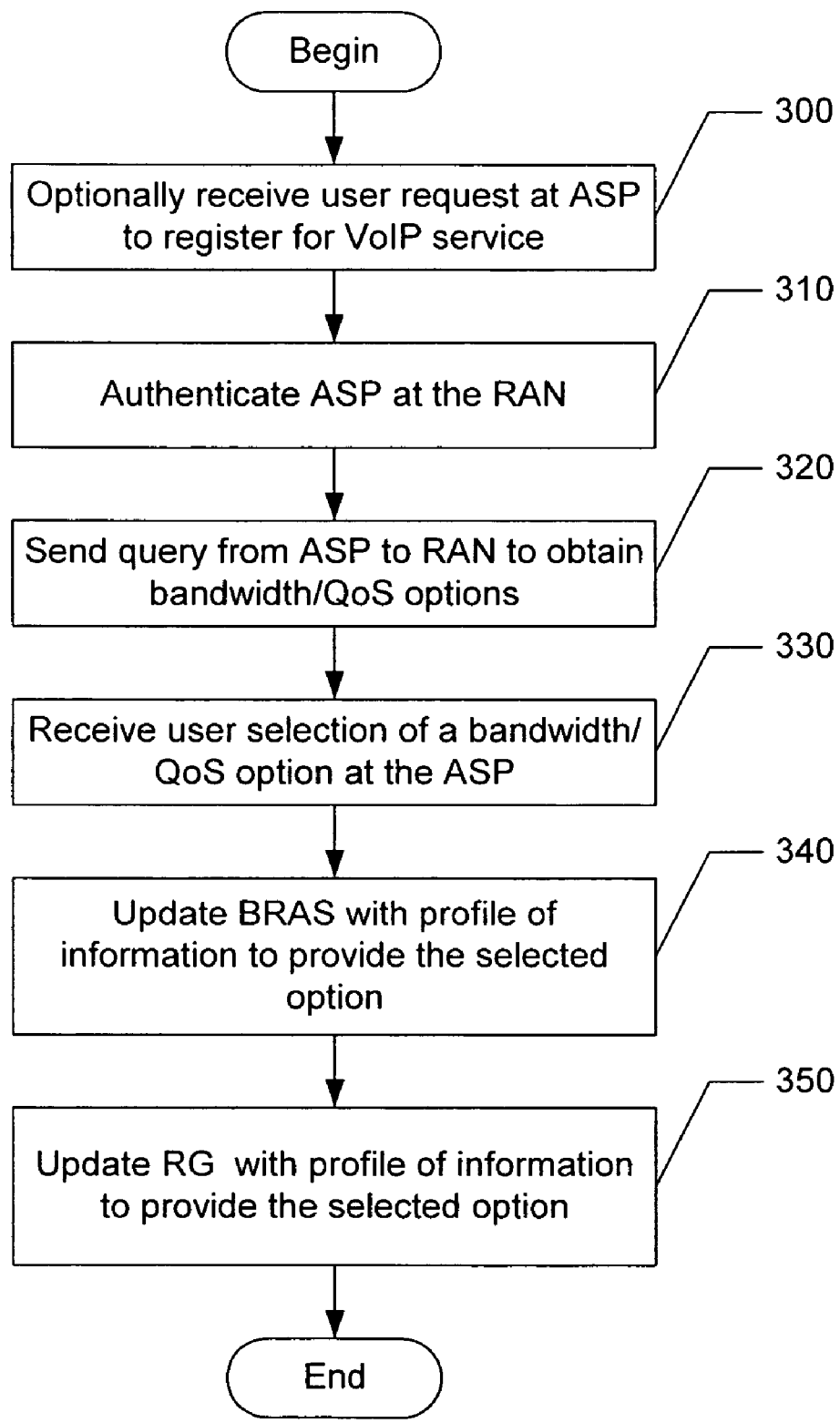

Operations for establishing VoIP service in a network, in accordance with further embodiments of the present invention, will now be described with respect to FIG. 3 and the event diagram of FIG. 4. With respect to FIG. 4, the numbers in square brackets are used to coordinate the descriptive text with the figure. Referring now to FIG. 3, operations begin at block 300 where the ASP optionally receives a user request to register for VoIP service. At block 310, the ASP is authenticated at the RAN. This is illustrated by events [1] and [2] in FIG. 4. In accordance with particular embodiments of the present invention, the ASP may be authenticated by sending an establish service session request message from the ASP to the RAN that contains an identification of the ASP along with authorization credentials. The RAN may send an establish service session response message back to the ASP that contains an authentication result.

The RAN may provide various billing options to the ASP. For example, the ASP may be billed based on the user selected bandwidth for the VoIP service. Alternatively, the ASP may be billed based on a facility purchased to connect the ASP to the RAN.

Figure 4:
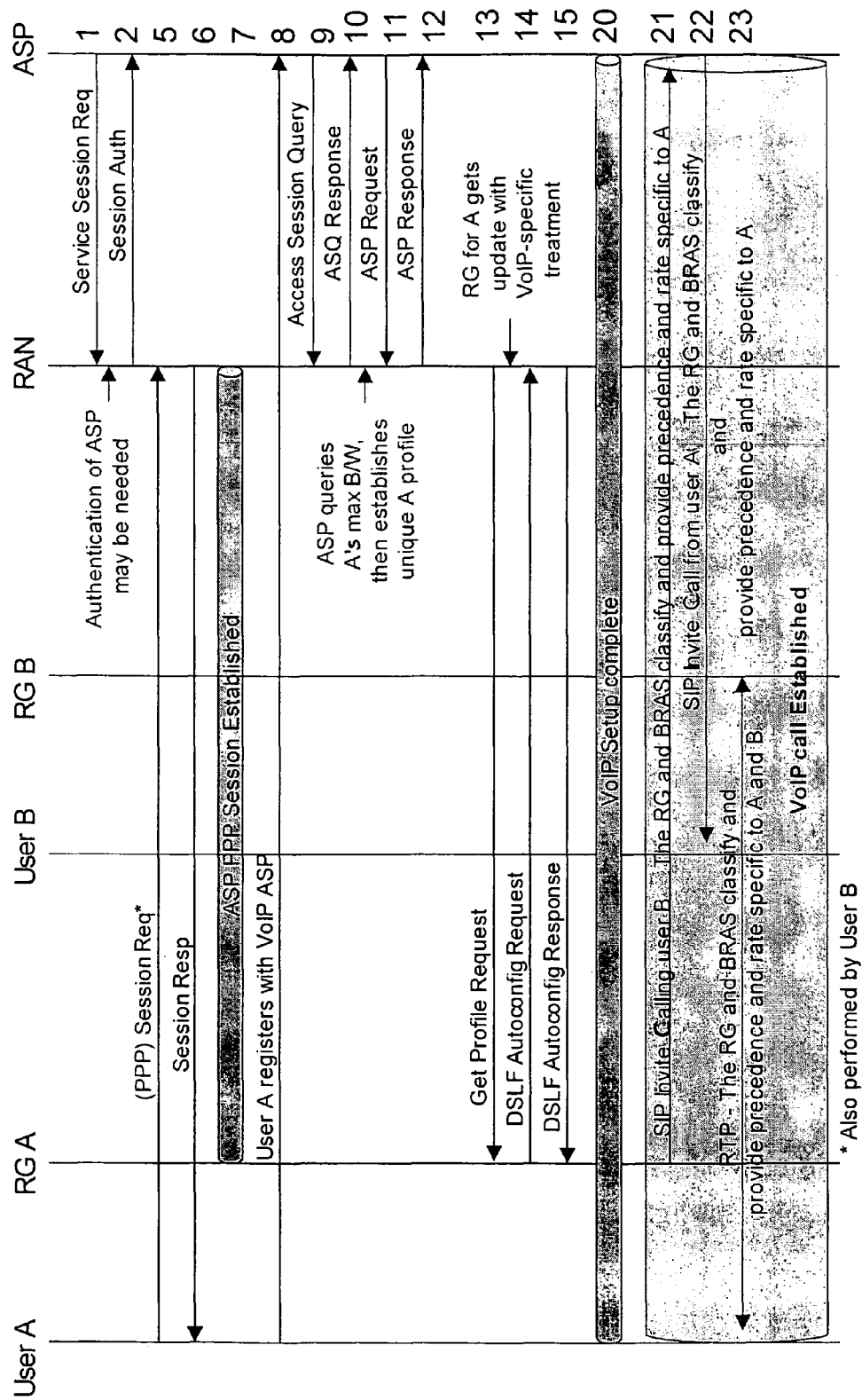
FIG. 4 is an event diagram that illustrates operations of the VoIP architecture of FIG. 2 in accordance with some embodiments of the present invention.

The user may then register with the ASP for VoIP service as indicated by event [8] in FIG. 4. As part of the registration, the ASP, at block 320 of FIG. 3, may send a query from the ASP to the RAN to obtain bandwidth/QoS options for the VoIP service as indicated by events [8] and [9] of FIG. 4. The user may, for example, download a VoIP client application and, at block 330 of FIG. 3, select a bandwidth/QoS option for the VoIP service. The bandwidth/QoS options may include, but are not limited to, a number of simultaneous lines and voice quality options per line. Moreover, the bandwidth/QoS options may include one or more derived service options, such as names corresponding to specific service options. For example, a user may be presented with the derived serviced options of gold, silver, and bronze, where the gold service level provides a higher level of bandwidth and/or QoS and the bronze level provides a lower level of bandwidth and/or QoS.

Once the user has selected one or more bandwidth/QoS options, the BRAS is updated with a profile of information to provide the selected bandwidth/QoS option(s) at block 340 of FIG. 3. This is illustrated by events [10] through [12] of FIG. 4. As part of updating the BRAS with the profile of information, a rate limit and/or QoS associated with a communication queue in the BRAS that is used to process VoIP traffic associated with the VoIP service may also be updated to support the selected bandwidth and/or QoS. Additionally, if the ASP is in the pay by the bandwidth provisioned model, then a billing record may also be generated to capture the amount of bandwidth requested by the ASP.

At block 350, the RG for the user is also updated with the profile of information provided to the BRAS at block 340 to provide the selected bandwidth/QoS for the user's VoIP service. This is illustrated by events [13] through [15] of FIG. 4.

Referring now to FIG. 4, the RGs of users A and B establish PPP sessions between their RG's and the RAN as indicated by events [5] through [7]. This may have occurred in advance of any VoIP activity (subscription or call initiation). A VoIP call may be established between user A and user B using the VoIP service provided by the ASP. For example, user A decides to call user B using the VoIP ASP's service as illustrated by event [21]. The ASP verifies that users A and B have active accounts and performs telephone number to IP address mapping and informs B of an inbound call. The RTP streams from the users are placed appropriately in the queues by the classifiers in the RG and the BRAS as illustrated by events [21] through [23].

More sophisticated VoIP features may also be provided by the ASP in accordance with various embodiments of the present invention. For example, the ASP may provide a VoIP service to support the following:

Calls to and from the PSTN

IP to IP calls across service providers

N-way audio conferencing. The addition of a conference bridge server would be just another network address associated with the ASPs VoIP service and used for classification.

Voice mail

Announcement server (network announcements, human operator access)

Interactive Messaging or Unified Messaging integration

The flowcharts of FIGS. 2 and 3 illustrate the architecture, functionality, and operations of some embodiments of systems, methods, and computer program products for establishing VoIP service in a network. In this regard, each block represents a module, segment, or portion of code, which comprises one or more executable instructions for implementing the specified logical function(s). It should also be noted that in other implementations, the function(s) noted in the blocks may occur out of the order noted in FIGS. 2 and 3. For example, two blocks shown in succession may, in fact, be executed substantially concurrently or the blocks may sometimes be executed in the reverse order, depending on the functionality involved.

Many variations and modifications can be made to the embodiments described herein without substantially departing from the principles of the present invention. All such variations and modifications are intended to be included herein within the scope of the present invention, as set forth in the following claims.

That which is claimed:

1. A method of establishing voice over Internet Protocol service in a network that comprises a regional access network that facilitates differentiated end-to-end data transport between an application service provider and a customer premises network that includes customer premises equipment, comprising:

using application programming interface calls between the application service provider and the regional access network to communicate directly with the regional access network without traversing any intermediate network nodes to establish voice over Internet Protocol service for a user; and receiving a request at the application service provider from the user to register for voice over Internet Protocol service before using application programming interface calls at the application service provider to communicate with the regional access network;

wherein using the application programming interface calls to communicate with the regional access network to establish voice over Internet Protocol service for the user comprises:

using application programming interface calls to communicate directly with the regional access network without traversing any of the intermediate network nodes to obtain a bandwidth range, quality of service capabilities, and at least one derived service option from the regional access network; and presenting to the user via the application service provider a bandwidth within the bandwidth range and a quality of service option within the quality of service capabilities and the at least one derived service option.

2. The method of claim 1, wherein the customer premises equipment comprises a routing gateway.

3. The method of claim 1, further comprising:

obtaining a user selection of at least one of the bandwidth and the quality of service option at the application service provider; and updating the regional access network with a profile of information to provide the at least one of the bandwidth and quality of service option that was selected for the user's voice over Internet Protocol service.

4. The method of claim 3, further comprising:

updating the customer premises equipment with the profile of information to provide the at least one of the bandwidth and the quality of service option that was selected for the user's voice over Internet Protocol service.

5. The method of claim 4, wherein updating the regional access network with the profile comprises:

updating a rate limit and quality of service associated with a communication queue in the regional access network that is used to process voice over Internet Protocol traffic associated with the user's voice over Internet Protocol service.

6. The method of claim 5, further comprising:

processing a voice over Internet Protocol call between the user and another user using the profile of information in the regional access network and the customer premises equipment.

7. The method of claim 1, further comprising:

authenticating the application service provider with the regional access network prior to using application programming interface calls at the application service provider to communicate with the regional access network to establish voice over Internet Protocol service for the user.

8. The method of claim 7, wherein authenticating the application service provider with the regional access network comprises:

sending an establish service session request message from the application service provider to the regional access network that contains an identification of the application service provider and authorization credentials; and sending an establish service session response message from the regional access network to the application service provider that contains an authentication result.

9. The method of claim 3, further comprising:

using the regional access network to bill the application service provider based on the bandwidth selected by the user for the voice over Internet Protocol service.

10. The method of claim 1, further comprising:
using the regional access network to bill the application service provider based on a facility purchased to connect the application service provider to the regional access network.

11. The method of claim 1, wherein the regional access network comprises a broadband remote access server.

12. A system for establishing voice over Internet Protocol service in a network, comprising:
a regional access network that facilitates differentiated end-to-end data transport between an application service provider and a customer premises network that includes customer premises equipment; and
means for using application programming interface calls between the application service provider and the regional access network to communicate directly with the regional access network without traversing any intermediate network nodes to establish voice over Internet Protocol service for a user; and
means for receiving a request at the application service provider from the user to register for voice over Internet Protocol service before using application programming interface calls at the application service provider to communicate with the regional access network;
wherein the means for using the application programming interface calls to communicate with the regional access network to establish voice over Internet Protocol service for the user comprises:
means for using application programming interface calls to communicate directly with the regional access network without traversing any of the intermediate network nodes to obtain a bandwidth range, quality of service capabilities, and at least one derived service option from the regional access network; and
means for presenting to the user via the application service provider a bandwidth within the bandwidth range and a quality of service option within the quality of service capabilities and the at least one derived service option.

13. The system of claim 12, wherein the customer premises equipment comprises a routing gateway.

14. The system of claim 12, further comprising:
means for obtaining a user selection of at least one of the bandwidth and quality of service option at the application service provider; and
means for updating the regional access network with a profile of information to provide the at least one of the bandwidth and the quality of service option that was selected for the user's voice over Internet Protocol service.

15. The system of claim 12, further comprising:
means for updating the customer premises equipment with the profile of information to provide the at least one of the bandwidth and the quality of service option that was selected for the user's voice over Internet Protocol service.

16. The system of claim 15, wherein the means for updating the regional access network with the profile comprises:
means for updating a rate limit and quality of service associated with a communication queue in the regional access network that is used to process voice over Internet Protocol traffic associated with the user's voice over Internet Protocol service.

17. The system of claim 16, further comprising:
means for processing a voice over Internet Protocol call between the user and another user using the profile of information in the regional access network and the customer premises equipment.

18. The system of claim 12, further comprising:
means for authenticating the application service provider with the regional access network prior to using application programming interface calls at the application service provider to communicate with the regional access network to establish voice over Internet Protocol service for the user.

19. The system of claim 18, wherein the means for authenticating the application service provider with the regional access network comprises:
means for sending an establish service session request message from the application service provider to the regional access network that contains an identification of the application service provider and authorization credentials; and
means for sending an establish service session response message from the regional access network to the application service provider that contains an authentication result.

20. The system of claim 12, further comprising:
means for billing the application service provider based on the bandwidth selected by the user for the voice over Internet Protocol service.

21. The system of claim 12, further comprising:
means for billing the application service provider based on a facility purchased to connect the application service provider to the regional access network.

22. The system of claim 12, wherein the regional access network comprises a broadband remote access server.

23. A computer program product for establishing voice over Internet Protocol service in a network that comprises a regional access network that facilitates differentiated end-to-end data transport between an application service provider and a customer premises network that includes customer premises equipment, comprising:
a computer readable storage medium having computer readable program code embodied therein, the computer readable program code comprising:
computer readable program code configured to use application programming interface calls between the application service provider and the regional access network to communicate directly with the regional access network without traversing any intermediate network nodes to establish voice over Internet Protocol service for a user; and
computer readable program code configured to receive a request at the application service provider from the user to register for voice over Internet Protocol service before using application programming interface calls at the application service provider to communicate with the regional access network;
wherein the computer readable program code configured to use the application programming interface calls to communicate with the regional access network to establish voice over Internet Protocol service for the user comprises:
computer readable program code configured to use application programming interface calls to communicate directly with the regional access network without traversing any of the intermediate network nodes to obtain a bandwidth range, quality of service capabilities, and at least one derived service option from the regional access network; and
computer readable program code configured to present to the user via the application service provider a bandwidth within the bandwidth range and a quality of service option within the quality of service capabilities and at the least one derived service option.

24. The computer program product of claim 23, wherein the customer premises equipment comprises a routing gateway.

25. The computer program product of claim 23, further comprising:
    computer readable program code configured to obtain a user selection of at least one of the bandwidth and the quality of service option at the application service provider; and
    computer readable program code configured to update the regional access network with a profile of information to provide the at least one of the bandwidth and quality of service option that was selected for the user's voice over Internet Protocol service.

26. The computer program product of claim 25, further comprising:
    computer readable program code configured to update the customer premises equipment with the profile of information to provide the at least one of the bandwidth and the quality of service option that was selected for the user's voice over Internet Protocol service.

27. The computer program product of claim 26, wherein the computer readable program code configured to update the regional access network with the profile comprises:
    computer readable program code configured to update a rate limit and quality of service associated with a communication queue in the regional access network that is used to process voice over Internet Protocol traffic associated with the user's voice over Internet Protocol service.

28. The computer program product of claim 27, further comprising:
    computer readable program code configured to process a voice over Internet Protocol call between the user and another user using the profile of information in the regional access network and the customer premises equipment.

29. The computer program product of claim 23, further comprising:
    computer readable program code configured to authenticate the application service provider with the regional access network prior to using application programming interface calls at the application service provider to communicate with the regional access network to establish voice over Internet Protocol service for the user.

30. The computer program product of claim 29, wherein the computer readable program code configured to authenticate the application service provider with the regional access network comprises:
    computer readable program code configured to send an establish service session request message from the application service provider to the regional access network that contains an identification of the application service provider and authorization credentials; and
    computer readable program code configured to send an establish service session response message from the regional access network to the application service provider that contains an authentication result.

31. The computer program product of claim 25, further comprising:
    computer readable program code configured to bill the application service provider based on the bandwidth selected by the user for the voice over Internet Protocol service.

32. The computer program product of claim 23, further comprising:
    computer readable program code configured to bill the application service provider based on a facility purchased to connect the application service provider to the regional access network.

33. The computer program product of claim 23, wherein the regional access network comprises a broadband remote access server.

* * * * *

UNITED STATES PATENT AND TRADEMARK OFFICE
CERTIFICATE OF CORRECTION

PATENT NO.        : 8,204,042 B2                                        Page 1 of 1
APPLICATION NO.   : 10/933940
DATED             : June 19, 2012
INVENTOR(S)       : Anschutz et al.

It is certified that error appears in the above-identified patent and that said Letters Patent is hereby corrected as shown below:

In the Claims:

Column 9, Claim 15, Line 50: Please correct "The system of claim 12,"
to read -- The system of claim 14, --

Column 10, Claim 20, Line 21: Please correct "The system of claim 12,"
to read -- The system of claim 14, --

Signed and Sealed this
Eleventh Day of September, 2012

David J. Kappos
*Director of the United States Patent and Trademark Office*